(12) United States Patent
Foucher et al.

(10) Patent No.: US 8,306,785 B2
(45) Date of Patent: Nov. 6, 2012

(54) ELECTRONIC DEVICE FOR MEASURING LEAKTIGHTNESS

(75) Inventors: Bruno Foucher, Chatillon Sous Bagneux (FR); Vincent Rouet, Orgeval (FR)

(73) Assignee: European Aeronautic Defence and Space Company EADS France, Paris (FR)

( * ) Notice: Subject to any disclaimer, the term of this patent is extended or adjusted under 35 U.S.C. 154(b) by 390 days.

(21) Appl. No.: 12/530,297

(22) PCT Filed: Mar. 5, 2008

(86) PCT No.: PCT/FR2008/050372
§ 371 (c)(1),
(2), (4) Date: Mar. 17, 2010

(87) PCT Pub. No.: WO2008/125775
PCT Pub. Date: Oct. 23, 2008

(65) Prior Publication Data
US 2011/0060547 A1    Mar. 10, 2011

(30) Foreign Application Priority Data
Mar. 9, 2007  (FR) ..................................... 07 53744

(51) Int. Cl.
*G06F 19/00*  (2011.01)

(52) U.S. Cl. ...................................................... 702/188
(58) Field of Classification Search .................. 702/188
See application file for complete search history.

(56) References Cited

U.S. PATENT DOCUMENTS

| 5,231,868 A | 8/1993 | Dick |
| 2002/0011934 A1 | 1/2002 | Cacioli et al. |
| 2004/0031339 A1 | 2/2004 | Swanson et al. |

FOREIGN PATENT DOCUMENTS

| DE | 3246227 | 6/1984 |
| DE | 29824541 | 3/2002 |

OTHER PUBLICATIONS

Florian Antretter, Effects of Air Leakage of Residential Buildings in Mixed and Cold Climates, p. 1-10, © 2007 ASHRAE).*
Nagel "Microsensor Clusters"; Microelectronics Journal, vol. 33, No. 1-2, Jan. 2, 2002, pp. 107-119.
International Search Report dated Oct. 28, 2008.

* cited by examiner

*Primary Examiner* — Tung S Lau
(74) *Attorney, Agent, or Firm* — RatnerPrestia

(57) ABSTRACT

To solve a leakage problem in a box, it is proposed to provide the box with an electronic circuit for measurement of its specific humidity. It is shown that by comparing this current specific humidity to an initial specific humidity and by evaluating the difference found in relation thereto, one has a reliable tool for measuring the permanence of tightness.

7 Claims, 6 Drawing Sheets

ELECTRONIC DEVICE FOR MEASURING LEAKTIGHTNESS

This application claims priority of PCT International Application No. PCT/FR2008/050372 filed on Mar. 5, 2008. The contents of which are incorporated herein by reference.

FIELD OF THE INVENTION

The object of the present invention is an electronic tightness measuring device. Its scope is that of all the electronic measuring, checking or control apparatuses that have to be protected from external attacks. According to the present invention, the tightness measuring device may be a device with no communications with the outside world, except for radioelectric communications, or with fluid optic type or wiring communications.

BACKGROUND

It is known in the field of tightness to design apparatus boxes satisfying IP standards, with which an, in particular, damp atmosphere inside the box is rigorously controlled. The IP degrees of protection against the penetration of liquids, and in particular, water, are 0: no protection, 1: drops of water falling vertically cannot penetrate, 2: drops of water falling at a maximum angle of 15° in relation to the vertical cannot penetrate, 3: rain, making a maximum angle of 60° in relation to the vertical cannot penetrate, 4: precipitation in all directions cannot penetrate, 5: water sprayed via a 6.3-mm water gun at a pressure of 0.3 bar cannot penetrate, 6: water sprayed via a 12.5-mm water gun at a pressure of 1 bar cannot penetrate, 7: protection against total immersion at a depth of 1 m, 8: equipment submersible at a great depth.

It turns out, however, that the atmosphere degrades inside the box; thus, an electronic circuit present in the box is affected thereby and ends up breaking down. As it were, the internal electronic circuit, due to its failure, marks the moment when the internal atmosphere in the box was no longer tolerable. Furthermore, it is noted that the phenomenon of degradation may last for a long time, for example, several years, before the manifestation of failure occurs.

The solution held in the state of the art for solving this problem is to reinforce the structures, and typically to place baffles inside the box so that the phenomenon of degradation of atmosphere occurs there as late as possible. This solution is not satisfactory because it leads, sooner or later, to the premature arrival of the failure of the electronic circuit.

In the present invention we proceeded in a different way to solve this problem. An electronic circuit for measuring the state of the atmosphere was included in the box itself. Moreover, this state is sent regularly outside the box to communicate its quality of permanent tightness, or even to lead sufficiently to the repair or changing of the box when the measurement reveals a failure. Thus, one goes from a practice, with which the compliance with packaging procedures was the only element of guaranty of tightness, to a measurement in real time of the state of the internal atmosphere and hence, in particular, of the conditions under which the box was closed and the conditions which it undergoes in its life, such as the changing of type of stresses going, for example, from IP6 to IP7.

It shall be noted that such an interpretation is not immediate insofar as it can be shown with the present invention that a box is thus defective, even if its internal humidity is reduced. In fact, if it is reduced, although the temperature and pressure remain constant, the point is that the tightness therein is not good, and that it is then possible that, under the circumstances, it increases, leading to failure of the circuit.

Furthermore, many electronic monitoring systems (stress recorder) perform a passive monitoring of the environment. The data acquired by these systems are transferred a posteriori or at regular intervals, in particular on a personal computer, for an extensive analysis.

SUMMARY OF THE INVENTION

According to the present invention, to optimize maintenance, it is necessary to improve the time that separates measurements, making it possible to identify a defect and the real identification of the defect. In the present invention, the circuit in the box is rendered intelligent. It integrates the algorithms, making it possible to process data at the source, in real time. Thus, as the measurement of a defect is performed, a warning can be given by the box itself.

Hence, the object of the present invention is an electronic tightness measuring device, which comprises an electronic circuit with a microprocessor, a program memory, a data memory as well as peripherals for measurement sensor, actuator and/or transmitter of data related to the measurements or actions performed by means of the box, characterized in that it comprises in this box, a sensor for the measurement of temperature, pressure, and relative humidity, and, in the program memory, a program for measuring a tightness of the box based on temperature, pressure and relative humidity measurements made inside the box.

In fact, in the present invention, it was shown that these conditions, in particular the relative humidity, should remain as constant as possible. If these conditions change too much, in association with a thermal cooling, they may lead to a condensation on the electronic circuit. Water or other condensed gases then deposit on the circuit and contribute to its deterioration. By measuring this change, or even by producing a history of this change, the occurrence of a failure can be predicted.

BRIEF DESCRIPTION OF THE DRAWINGS

The present invention shall be better understood upon reading the following description and examining the figures that accompany it. In the figures.

DETAILED DESCRIPTION

Figure 1:
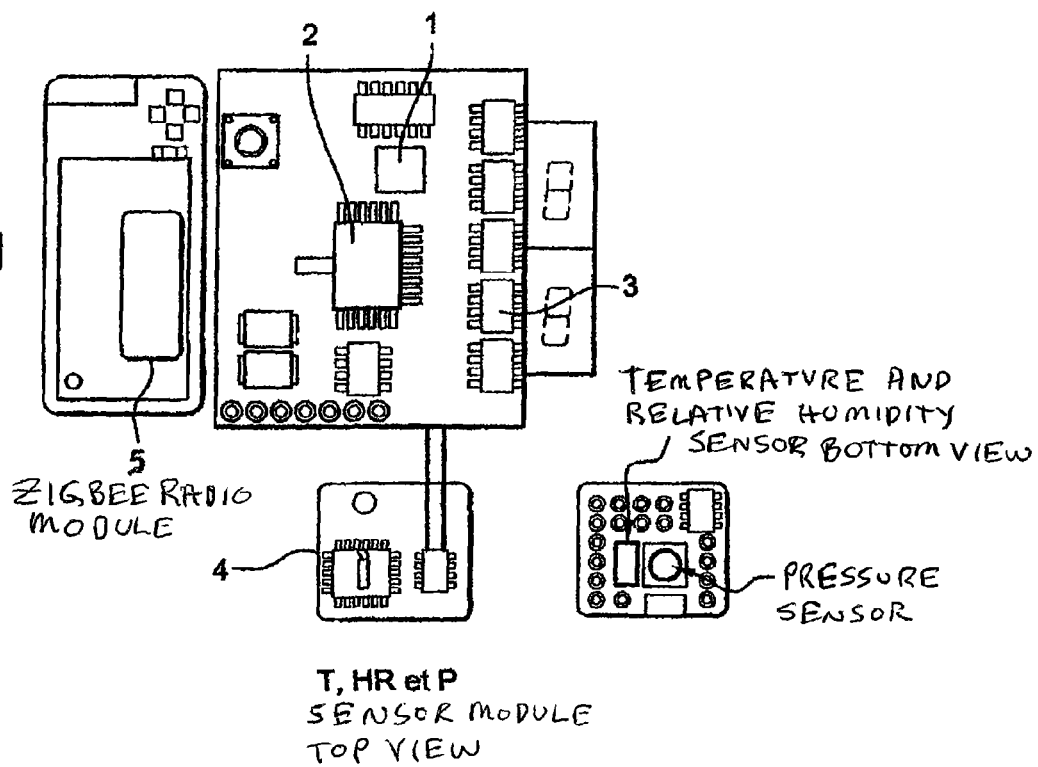
FIG. 1 shows an integrated electronic monitoring system according to the present invention.

According to the present invention, the tightness problems can be detected by integrating the calculations performed on three environmental variables: temperature, relative humidity and pressure, tracking the relative humidity alone is not sufficient. Monitoring of the tightness is ensured by tracking the change in the specific humidity.

Theoretical Behavior of Humid Air

Humid air is air for which the water that it contains is taken into account. Three parameters make it possible to characterize it: temperature (T), relative humidity (RH) and specific humidity (W). The following definitions can be found in the specialized literature dealing with the behavior of environmental variables, and particularly in "Pratique de l'hygrométrie, notions fondamentales et utilisation des diagrammes" [Practice of Hygrometry, Fundamental Notions and Use of Diagrams—Tr.], C. Wasmer, Elcowa edition, 1988.

The humidity of the air can be quantified in two different ways. The first parameter which is taken into account is relative humidity. It is the ratio of the partial pressure of water vapor contained in air to the partial pressure of water vapor saturation.

The partial pressure of a gas in a mixture of gases is the pressure pertaining to one of the constituents of the mixture. The sum of the partial pressures of the different gases is equal to the total pressure of the mixture. The mixture considered here shall always be air, and therefore, this total pressure shall be generally atmospheric pressure.

The partial pressure of water vapor saturation is the water vapor partial pressure value that has to be attained for water to condense. This value depends on the temperature of the air as well as on its water composition. When the partial pressure of water vapor saturation is reached, the relative humidity is inevitably 100%, i.e., the air has its maximum admissible quantity of water vapor. It is in this context that there is condensation of the water contained in air. The corresponding data can be found on the internet site http://www.thermique55.com/principal/airhumide.pdf.

The second parameter making it possible to quantify the humidity of air is specific humidity. This is the ratio of the mass of water contained in air to the mass of dry air. Hence, this value shall always be lower than the unit. Contrary to relative humidity, this parameter does not characterize a state of water vapor saturation of the air.

Specific humidity may also be defined as a function of two air parameters: its total pressure P and its water vapor partial pressure Pv. A theoretical treatise on the behavior of humid air (see Techniques de l'ingénieur, traité génie énergétique [Engineering Techniques, Energy Engineering Treatise-Tr.], volume 2, p. 230, Maxime Duminil, August 1986) makes it possible to find these relationships.

Consequently, dry air and vapor are supposed to behave like perfect gases. It is considered as well that air is a mixture of dry air and of water vapor and that dry air is solely made up of 80% nitrogen (molar mass=32) and 20% oxygen (molar mass=28).

Case of Dry Air

According to the law of perfect gases, according to the information accessible on the internet site http://www-ipst.u-strasbg.fr/jld/gaz-p.htm:

$$P \times V = n \times R \times T \quad (1)$$

in which V (m³/kg) is the mass volume of gas, R=8.314 JK⁻¹ mol⁻¹ is the universal constant of perfect gases, n is the number of moles, P is pressure and T is temperature in Kelvin.

Assuming n=m/M and r=R/M in which m is mass and M is molar mass, one obtains $$(2). \quad P \times V = r \times T$$

Then, using the above formula applied to dry air, one finds:

$$Pa \times V_a^* = r_a \times T \quad (3)$$

$$m_a^* = \frac{1}{V_a^*} = \frac{Pa}{r_a T} \quad (4)$$

$$m_a^* = \frac{Pa}{287{,}05 \times T} \quad (5)$$

in which $P_\alpha$ is the pressure of dry air, $V_\alpha^-$ (m³/kg) is the mass volume of dry air, $r_\alpha$=287.05 Jk⁻¹ kg⁻¹ is the constant of perfect gases for dry air, $m_\alpha^-$ is the volume mass of dry air and T (K) is the temperature.

Case of Water Vapor

In the same way:

$$Pv \times V_v^* = r_v \times T \quad (6)$$

$$m_v^* = \frac{1}{V_v^*} = \frac{Pv}{r_v T} \quad (7)$$

$$m_v^* = \frac{Pv}{461{,}51 \times T} \quad (8)$$

in which $P_v$ is the pressure of humid air, $V_v^-$ (m³/kg) is the mass volume of humid air, $r_v$=461.51 JK⁻¹ kg⁻¹ is the constant of perfect gases for humid air, $m_v^-$ is the volume mass of humid air and T is the temperature in Kelvin.

Application of Dalton's Law

According to Dalton's law:

$$P = Pa + Pv \quad (9)$$

The volume mass of dry air is thus, according to equations (5) and (9):

$$m_a^* = \frac{P - Pv}{287{,}05 \times T} \quad (10)$$

The mass $m_\alpha$ of dry air occupying a volume V is:

$$m_a = m_a^* \times V = \frac{(P - Pv) \times V}{287{,}05 \times T} \quad (11)$$

The mass $m_v$ of water vapor occupying a volume V is:

$$m_v = m_v^* \times V = \frac{Pv \times V}{461{,}51 \times T} \quad (12)$$

Obtaining the Specific Humidity W

By definition, the specific humidity W is the ratio of the mass $m_v$ of water vapor contained in a volume V of humid air to the mass $m_\alpha$ of dry air contained in this same volume (expressed in %). According to equations (11) and (12):

$$W = \frac{m_v}{m_a} = \frac{m_v^* V}{m_a^* V} = \frac{m_v^*}{m_a^*} = \frac{287{,}05}{461{,}51} \times \frac{Pv}{P - Pv} \Rightarrow W = 0{,}622 \times \frac{Pv}{P - Pv} \quad (13)$$

Hence, the specific humidity W depends on the water vapor partial pressure (Pv) and on the total pressure.

The following equations, of empirical origin, make it possible to connect the parameters of relative humidity RH, temperature T and specific humidity W. Pvs is the saturated water vapor pressure.

$$Pvs = 1{,}000 \times \exp(A \times T^2 + B \times T + C + D \times T^{-1}) \quad (14)$$

The constants A, B, C and D, cited by the document ASHRAE, Psychrometrics: Theory and Pratice [sic, Practice-Tr.], A. Gonzalez, 1996 have different values according to the temperature T range considered.

TABLE 1

| | Value of the four constants A, B, C and D for different temperature ranges (Kelvin) | | | | |
|---|---|---|---|---|---|
| | 213.15 < T < 273.15 | 273.15 < T < 322.15 | 322.15 < T < 373.15 | 373.15 < T < 423.15 | 423.15 < T < 473.15 |
| A ($K^{-2}$) | −7.29759E−06 | 1.255E−05 | −1.24673E−05 | 1.20451E−05 | 1.06973E−05 |
| B ($K^{-1}$) | −0.005397421 | −0.019235953 | −0.019154658 | −0.018666506 | −0.016989658 |
| C | 20.6988062 | 27.05101899 | 27.02388315 | 26.83629403 | 26.14073298 |
| D (K) | −6042.275128 | −6344.011577 | −6340.941639 | −6316.972 | −6220.78123 |

We also have:

$$T = E \times (\ln(Pvs))^4 + F \times (\ln(Pvs))^3 + G \times (\ln(Pvs))^2 + H \times (\ln(Pvs)) + K \quad (15)$$

Here, the constants E, F, G, H, and K also have different values for different total pressure P ranges of the air considered.

TABLE 2

| | Value of the five constants E, F, G, H and K for different air total pressure ranges | | | | |
|---|---|---|---|---|---|
| | 1 < P < 611 | 611 < P < 12350 | 12350 < P < 101420 | 101420 < P < 476207 | 476207 < P < 1555099 |
| E | 0.001004927 | 0.00531063 | 1.20951E−05 | 0.02467291 | 2.7484E−05 |
| F | 0.001392918 | −0.088267794 | −0.354554211 | −0.936711288 | −1.068661307 |
| G | 0.281515157 | 1.243688446 | 212.5893734 | 15.14142334 | 17.42964692 |
| H | 7.311621119 | 3.388534296 | −20.5030105 | −98.82417501 | −116.1208532 |
| K | 212.5893734 | 215.0077993 | 271.8585432 | 499.5092948 | 547.261812 |

In addition, as $$RH = \frac{Pv}{Pvs} \text{ and } W = 0.622 \times \frac{Pv}{P - PV},$$

provisions can hence be made for the relative variations of these three parameters.

$$W = 0.622 \times \frac{RH \times Pvs}{P - RH \times Pvs} \quad (16)$$

The above W equation makes it possible to obtain the following expression of the relative humidity RH as a function of the two parameters temperature and total pressure:

$$RH = \frac{1}{10} \times \frac{W}{(0.622 + 1)^{-1}} \times \frac{W}{0.622} \times P \times \exp(-A \times T^2 - B \times T - C - D \times T^1) \quad (17)$$

Figure 5:
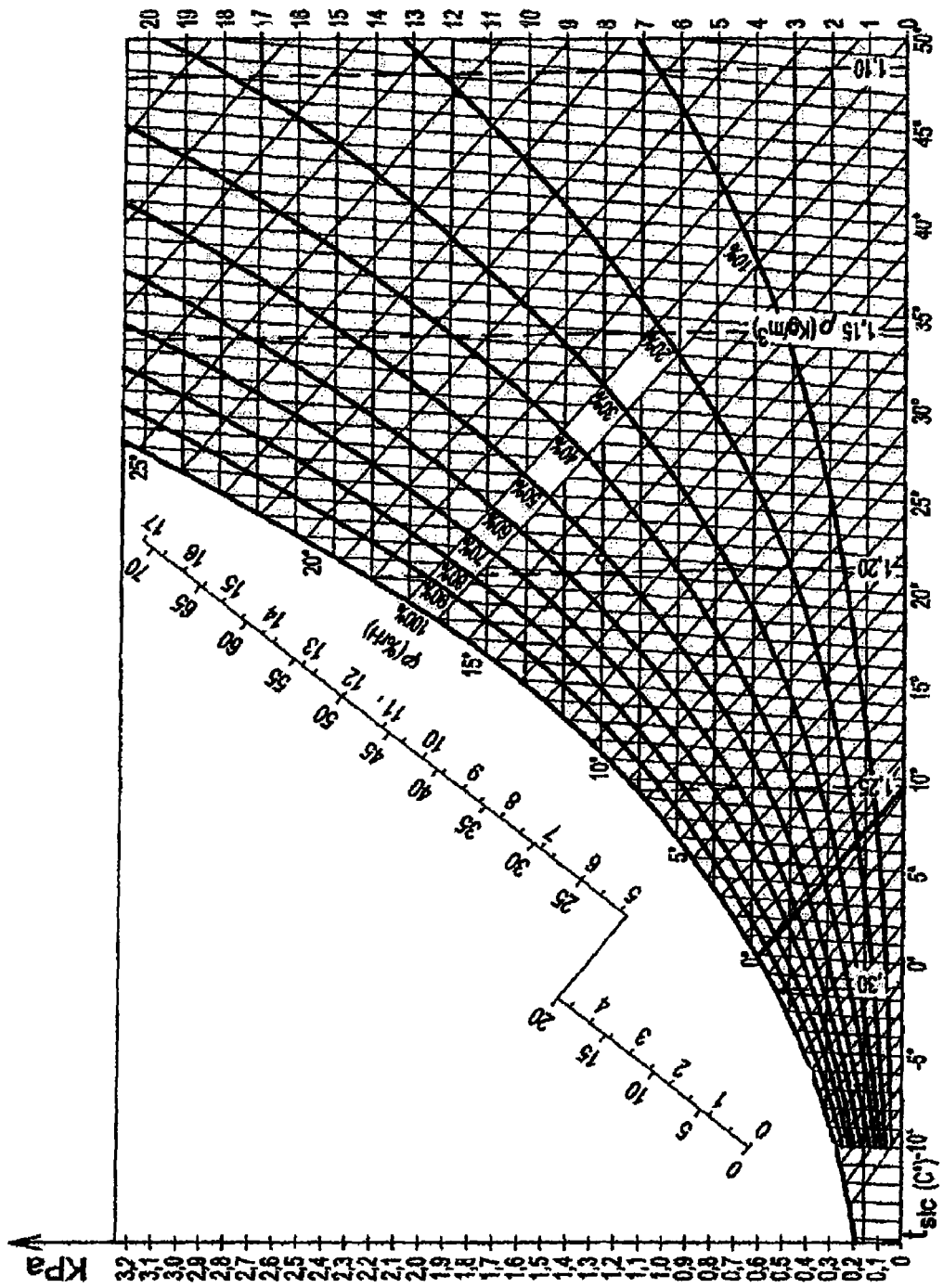
FIG. 5 shows a conversion diagram used by the program of the present invention.

It is from the above W expression (16) that a psychrometric diagram can be traced, which makes it possible to illustrate the relative variations of three variables T, W and RH. It is shown in FIG. 5. It represents the variation in specific humidity W as a function of temperature variations. It is a network of curves, each curve W=f(T) being traced for a value of RH. By setting two of these variables, the state of the humid air is determined. Each diagram is established for a set value of the total pressure P. A more complete description is found in the above-mentioned work "Practice of Hygrometry."

The conventional diagram contains two additional variables that we will not use: the humid temperature, noted as $t_{hyg}$ on the diagram and enthalpy, noted as h. The humid temperature is the measured temperature, considering that the relative humidity is 100%, which, in practice, is the case when the bulb that measures it lies in wet laundry. The enthalpy is expressed in Joules per kg, and represents the quantities of heat exchanged during a heat cycle described on the diagram.

According to the present invention, these equations can thus be used for the detection of leaks or tightness problems. Their integration in an electronic monitoring system such as a HUMS (Health and Usage Monitoring System) is quite feasible for monitoring the course of the specific humidity W in a shipped environment and in real time by means of temperature, relative humidity and pressure sensors.

The object, FIG. 5, of the device of the present invention, FIG. 1, is hence to measure the three parameters mentioned above RH, P and T regularly. In this respect, FIG. 1, the device of the present invention comprises, in a box that is not shown but supposed to be monitored by the device, an electronic circuit 1 with a microprocessor 2. The microprocessor 2 may contain program or data memories 3, or those that may be formed by discreet components such as 3 shown on the circuit 1. The device also comprises a sensor or actuator peripheral 4, suitable for performing an electronic function assigned to the circuit 1. According to the present invention, the device comprises sensors, here integrated in the sensor module 4, front and back views, interconnected to the circuit 1, and suitable for measuring the temperature T, pressure P and relative humidity RH inside the box. In the program memory is recorded a program whose flow chart is detailed in reference to FIGS. 2a and 2b. These measurements, after being edited to homogenize the values, make possible, according to this program, the calculation of the specific humidity W. Preferably, the circuit 1 comprises a radioelectric transmission module 5, for example, a Zigbee type module, for sending the results of the measurements outside the box. Otherwise, the results may be sent by creating an optical window in the box and by having LEDs facing this window, or even by electric wires passing through the wall of the box.

From the formulas (14) and (16), the following formula is obtained:

$$W = 0.622 \times \frac{RH \times 1,000 \times \exp(A \times T^2 + B \times T + C + D \times T^1)}{P - RH \times 1,000 \times \exp(A \times T^2 + B \times T + C + D \times T^1)}$$

In this formula, A, B, C and D are the constants, depending on the temperature, of Table 1.

Figure 2A:
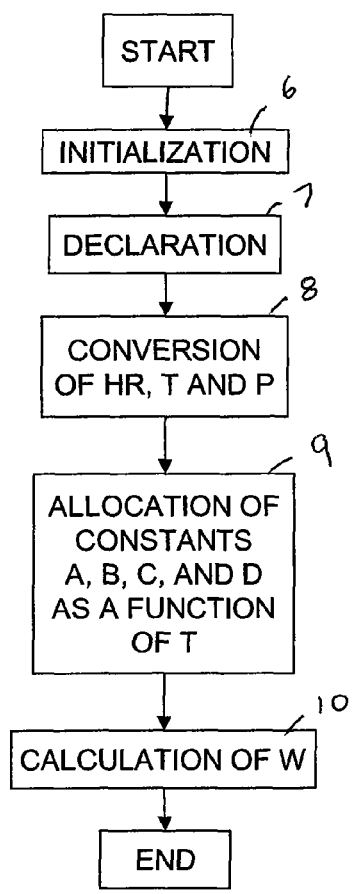
FIGS. 2a and 2b show a leak detection algorithm to be used with the program of the present invention.
Figure 2B:
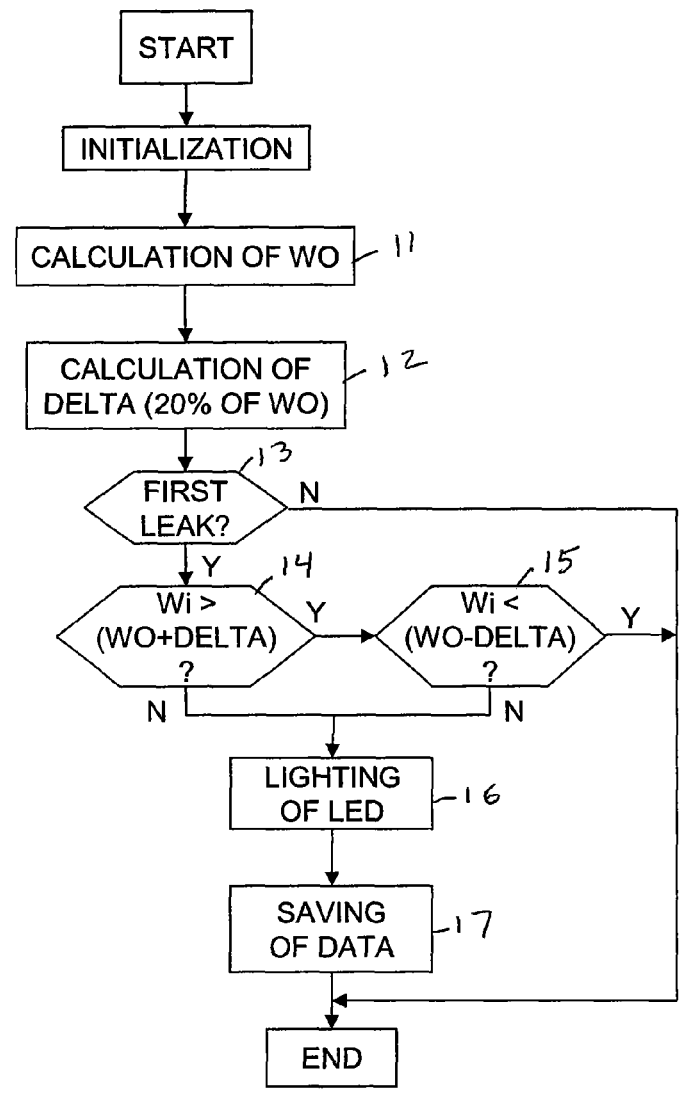

For a simpler embodiment, this function was set thanks to two subfunctions, FIGS. 2a and 2b. A first program, FIG. 2a, makes it possible to calculate the value of the specific humidity W. After a step 6 of initialization and putting into operation of the circuit 1, a step 7 makes it possible, by way of declaration, to parameterize the circuit 1.

As specified above, W is a combination of T, RH and P. However, the units of each of the values must be observed to obtain a coherent W. This is why a conversion step 8 is present before performing the true calculation. Step 8 makes it possible to calculate the parameters RH, T and P from the measurement performed by the sensors of the module 4. Since the module 4 is a classical type, its sensors, of a known type, deliver electric signals, which are quantified and standardized to correspond to the parameters RH, T and P effectively measured.

In addition, since the constants A, B, C and D depend on the temperature, the good values to be employed for the calculation of W must be determined beforehand. Also, in a next step 9, the microprocessor 9 searches for the values of the parameters A, B, C, and D as a function of T in the data memory, which stores Tables 1 and 2.

After all these steps, it is possible to truly calculate the specific humidity W before making the information available for the detection of a leak. At the last step 10, the microprocessor 2 calculates the tightness: specific humidity W.

A second function uses the preceding function for so-called leak detection. Its operation is described in the algorithm shown in FIG. 2b.

First of all, at a step 11, the initial specific humidity $W_0$ is calculated thanks to all the first temperature, relative humidity and pressure values. This initial specific humidity is used as a reference as far as the course of this variable is concerned. These first values are those found inside the box at the time of its tight sealing. Step 11 reproduces the algorithm of FIG. 2a, but at the time of sealing, in principle, under good sealing conditions. After this, at step 12, in a preferred example, a deviation corresponding to 20% of $W_0$ is calculated or set. It runs the calculation of the precision of the different sensors as well as roundings. Preferably, compared to the initial specific humidity, the threshold is programmable as a function of the measurement precision of the sensors. With the sensors used, it was possible to show that a detection below a threshold, for example, 20%, of $W_0$ would not make it possible to determine a true leak. In other words, one calculates or sets a relative threshold beyond which it is considered that the relative humidity has changed too much, signaling the arrival of a leak. In fact, whether humid air enters or exits the box, the relative humidity varies, and a leak is present. Finally, the program will test whether or not the W values, at the time of the measurement, are different from $W_0$ modulated from the deviation of 20%.

During a first, optional, test 13, it is verified that the leak detected is detected for the first time. If a leak has already been detected, the box is considered to be defective, and its tightness is no longer truly measured because it is already known that it is defective. The existence of such a defect may thus be stored in a memory read at the time of the test 13. If the tightness has never been found to be defective, during the two tests 14 and 15, one measures whether the variation of the specific humidity W has varied more or less from the value of a threshold, here relative, in this case set at 20%. If this is not the case, the circuit 1 returns, by the end step, to a periodic scanning. If not, an alarm is triggered at step 16, the data of the monitored device are saved, at step 17, at the same time that the observation of the occurrence of the leakage is stored (to be used in a later test 13).

The leak detection function is preferably installed in the program of the microcontroller 2 of the electronic circuit 1. Hence, the leak detection triggers a signal, warning about the presence of the problem by the intermittent lighting of an LED visible through a transparent window of the box (or another system) present on the prototype and/or by the sending of a radioelectric wave signal (repeatedly or at the request of the status). As it were, the box of the present invention comprises a means for editing a leakage warning message.

Figure 3:
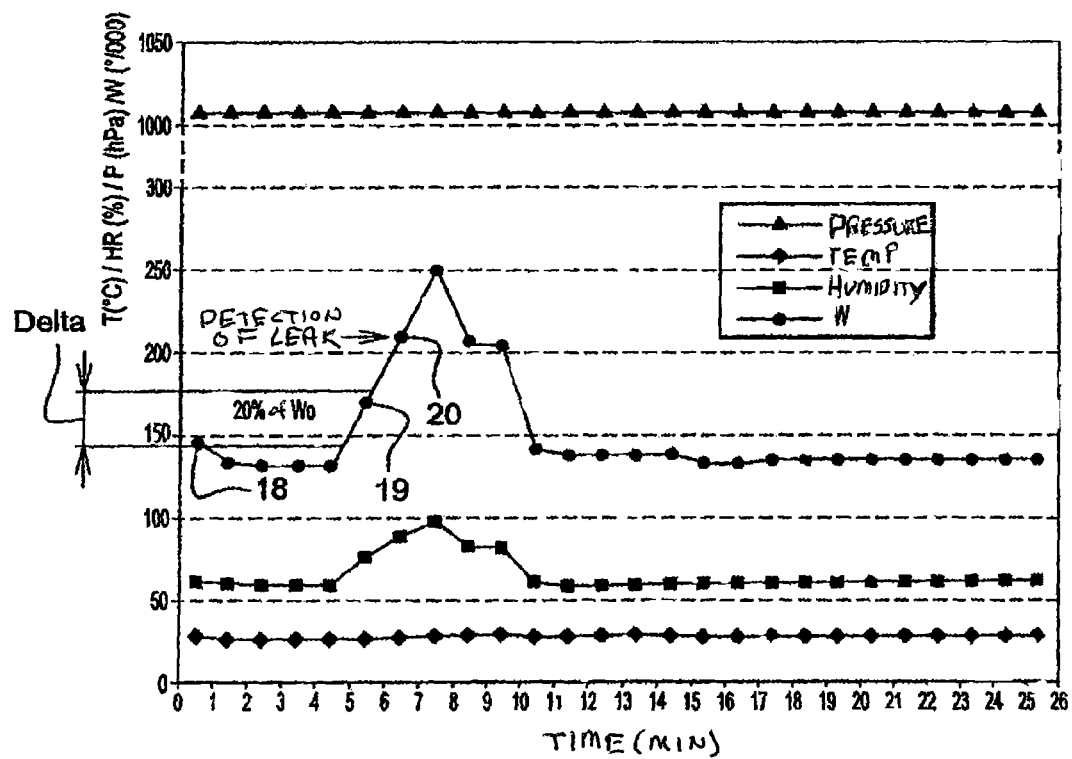
FIG. 3 shows an example of a leak detection test in an open environment.

Tests were conducted to validate the operation of the detection algorithm integrated in a prototype. They were performed with different rates of taking regular measurements (from every 5 seconds to every hour). FIG. 3 shows one of the tests carried out at ambient temperature and pressure (28° C., 1,009 hPa) in an open environment. The measurement 18 is a measurement of Wo =0.0144. It leads, for a delta set at 20%, to a deviation off 0.00288. Hence the theoretical detection is set at 0.01728 or 0.01152. The measurement 19 is a measurement before detection: W=0.0170. The measurement 20 is a leak detection measurement: W=0.0210. It triggers a lighting of an LED on the prototype. It is noted that the detection occurs at the measurement closest to the theoretical value. For a more reliable, temporal measurement step, the detection should have been made much sooner (at 0.018, for example).

During a supply of humidity, for example, because of breathing, the relative humidity increases. The calculation of current W (and hence leak detection) signals the presence of a problem (lighting of the diode) beyond a deviation of 20% compared to the starting specific humidity. These curves show the good operation of the leak detection program.

Figure 4:
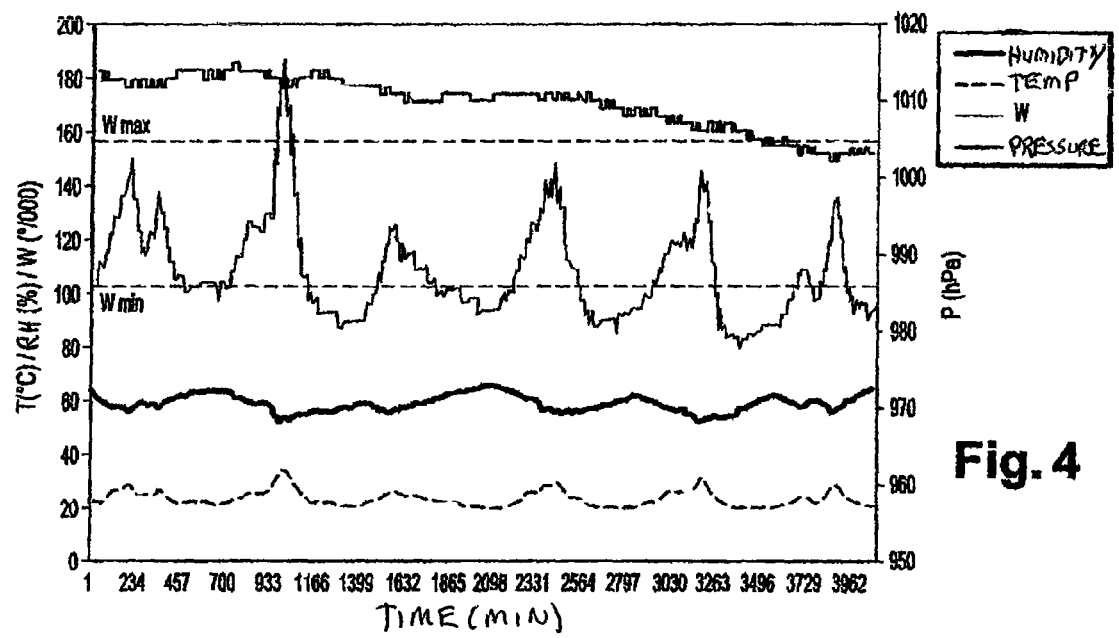
FIG. 4 shows an example of a leak detection test in a pseudo-sealed environment.

Likewise, other tests were carried out in a semi-closed environment materialized by an IP 55 junction box. After several days of measurements with a reading every 2 minutes, the use of the two applications mentioned in the preceding chapters makes it possible to obtain the curves shown in FIG. 4.

The inadequate sealing of the box is only ensured by a rubber joint pressed to the four corners. The leaks observed come from a true lack of sealing of this box. On three days, ca. 4,000 minutes, the temperature and relative humidity therefore change logically cyclically with a pressure which varies from 1,014 to 999 hPa. This defect thus made it possible to verify the conformity of the test set up.

During all the measurements, the specific humidity W was calculated as a function of the starting parameters. By comparing these results to the initial value at the beginning of the test, the prototype detected a deviation of W greater than 20% compared to its initial value.

The prototype thus considered a leak after only 8 hours of operation, at 476 minutes. For $W_0$ equal to 0.0129, a variation of 0.00258 made it possible to determine the admissible minimum and maximum values of W before the lighting of the diode indicating the detection. By making all the data correspond, it appears that the triggering occurred well within expectations.

Table 3 below summaries different parameters brought into play for leak detection:

|  | Temperature (° C.) | Relative humidity (%) | Pressure (hPa) | Specific humidity |
|---|---|---|---|---|
| Start | 24 | 69 | 1,014 | 0.012961 |
| Detection | 22 | 62 | 1,014 | 0.010273 |

Figure 6:
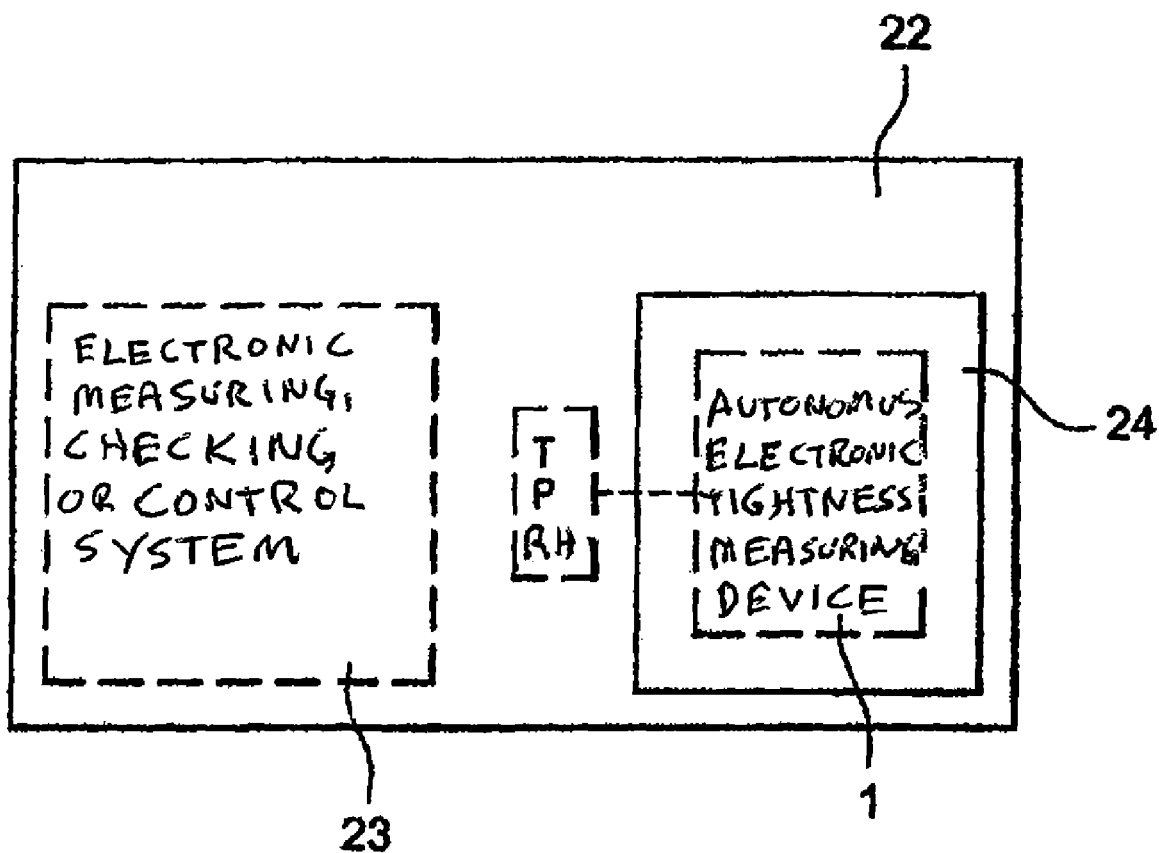
FIG. 6 shows a general view of an application of the electronic tightness measuring device of the present invention.

FIG. 6 shows the use of the device 1 of the present invention. This [device 1] is placed in a sealed box 22 to be monitored and which comprises an electronic measuring, checking or control system 23 for a function assigned to the box 22. Optionally, the device 1 may itself be placed in an optional sealed box 24. In this case, the device 1 has a function of self-diagnosing its own tightness.

In practice, the device shall be placed without protection in the box 22 or 24.

Preferably, the microprocessor of the system 23 will be able to be used for implementing the function of the device 1, in such a way that the latter will practically only impose the installing of a sensor module 4.

The invention claimed is:

1. Autonomous electronic tightness measurement device, integrated in a sealed box to be monitored, comprising an electronic circuit with a microprocessor, a program memory, a data memory and peripherals for at least one of a measurement sensor, actuator or transmitter of data related to the measurements or to actions performed by means of the box, wherein the electronic circuit comprises a sensor for measurement of the temperature (T), pressure (P) and relative humidity (RH) of the internal atmosphere of the box, and a program in the program memory for calculating a specific humidity (W) of the internal atmosphere of the box based on the temperature, pressure and relative humidity measurements, and for checking the tightness of the box by comparing the specific humidity with an initial value ($W_0$).

2. Device in accordance with claim 1, further comprising means in the box for editing a leakage warning message.

3. Device in accordance with claim 1, further comprising means for transmitting a tightness measurement.

4. Device in accordance with claim 1, wherein the program comprises a step for calculating the specific humidity of the box according to the formula:

$$W = 0.622 \times \frac{RH \times 1,000 \times \exp(A \times T^2 + B \times T + C + D \times T^1)}{P - RH \times 1,000 \times \exp(A \times T^2 + B \times T + C + D \times T^1)}$$

in which:
W is the specific humidity,
HR, T and P are the relative humidity, temperature, and pressure, respectively measured in the internal atmosphere of the box,
A, B, C, and D are constants stored in the data memory of the electronic circuit.

5. Device in accordance with claim 1, wherein the program memory includes computer program instructions to calculate a relative threshold of the current specific humidity exceeding the initial specific humidity, the exceeding of the initial specific humidity indicating a tightness defect of the box.

6. Device in accordance with claim 5, wherein the relative threshold with regard to the initial specific humidity is programmable as a function of a measurement precision of the sensors.

7. Device in accordance with claim 1, wherein the electronic circuit is configured in a further sealed box and is configured for self-diagnosing tightness of the further sealed box.

* * * * *